(12) United States Patent
Khoo et al.

(10) Patent No.: US 11,199,858 B2
(45) Date of Patent: Dec. 14, 2021

(54) THRUST VECTORED MULTICOPTERS

(71) Applicant: DEAKIN UNIVERSITY, Waurn Ponds (AU)

(72) Inventors: Sui Yang Khoo, Waurn Ponds (AU); Michael John Norton, Waurn Ponds (AU); Abbas Zahedi Kouzani, Waurn Ponds (AU)

(73) Assignee: DEAKIN UNIVERSITY, Waurn Ponds (AU)

(*) Notice: Subject to any disclaimer, the term of this patent is extended or adjusted under 35 U.S.C. 154(b) by 222 days.

(21) Appl. No.: 16/341,978

(22) PCT Filed: Oct. 18, 2017

(86) PCT No.: PCT/AU2017/051129
§ 371 (c)(1),
(2) Date: Apr. 15, 2019

(87) PCT Pub. No.: WO2018/071970
PCT Pub. Date: Apr. 26, 2018

(65) Prior Publication Data
US 2019/0243385 A1 Aug. 8, 2019

(30) Foreign Application Priority Data
Oct. 18, 2016 (AU) .............................. 2016904231

(51) Int. Cl.
  *B64C 27/08* (2006.01)
  *B64C 27/20* (2006.01)
  (Continued)

(52) U.S. Cl.
  CPC .......... *G05D 1/0858* (2013.01); *B64C 27/08* (2013.01); *B64C 27/20* (2013.01); *B64C 27/52* (2013.01);
  (Continued)

(58) Field of Classification Search
  CPC ....... B64C 39/024; B64C 27/08; B64C 27/52; B64C 2201/027; B64C 2201/162;
  (Continued)

(56) References Cited

U.S. PATENT DOCUMENTS 10,450,062 B1 * 10/2019 Bova .......................... B64C 5/06
2016/0290809 A1 * 10/2016 Eline ......................... G06T 7/20

FOREIGN PATENT DOCUMENTS

GB          2486448 A       6/2012

OTHER PUBLICATIONS

Ryll, et al. ("A Novel Overactuated Quadrotor UAV: Modeling, Control and Experimental Validation", IEEE Transactions on Control Systems Technology, Mar. 2015, vol. 23, No. 2, pp. 540-556). (Year: 2015).*

(Continued)

*Primary Examiner* — Abby Y Lin
*Assistant Examiner* — Hossam M Abd El Latif
(74) *Attorney, Agent, or Firm* — Jason Novak; William T. Hoyer McCarthy; Haynes and Boone LLP

(57) ABSTRACT

A method of operating a multicopter comprising a body and n thrusters, each thruster independently actuated to vector thrust angularly relative to the body about at least a first axis, the method comprising modelling dynamics of the multicoptor with a mathematical model comprising coupled, non-linear combinations of thruster variables, decoupling the mathematical model into linear combinations of thruster control variables, sensing at least one characteristic of multicopter dynamics, comparing the sensed data with corresponding target characteristic(s), computing adjustments in thruster control variables for reducing the difference between the sensed data and the target characteristic(s) according to a control algorithm, and actuating each thruster according to the computed thruster control variables to (Continued)

converge the multicopter towards the target characteristic(s), wherein the control algorithm is based on the decoupled mathematical model such that each thruster control variable can be adjusted independently.

9 Claims, 5 Drawing Sheets

(51) Int. Cl.
  *B64C 27/52* (2006.01)
  *B64C 39/02* (2006.01)
  *G05B 13/04* (2006.01)
  *G05D 1/00* (2006.01)
  *G05D 1/08* (2006.01)
(52) U.S. Cl.
  CPC ............ *B64C 39/024* (2013.01); *G05B 13/04* (2013.01); *G05D 1/0088* (2013.01); *B64C 2201/027* (2013.01); *B64C 2201/162* (2013.01)
(58) Field of Classification Search
  CPC ...... B64C 27/20; G05B 13/04; G05D 1/0858; G05D 1/0088; G05D 1/0825
  USPC .......................................................... 701/3
  See application file for complete search history.

(56) References Cited

OTHER PUBLICATIONS

Amiri et al, ("Modelling of Opposed Lateral and Longitudinal Tilting Dual-Fan Unmanned Aerial Vehicle", IFAC Proceedings, Elsevier, 2011, vol. 44, pp. 2054-2059) (Year: 2011).*
Jayakody, H, "Robust Control of Vectored Thrust Aerial Vehicles via Variable Structure Control Methods", PhD thesis, School of Mechanical and Manufacturing Engineering, University of New South Wales, Aug. 2016). (Year: 2016).*
International Search Report and Written Opinion of the International Searching Authority for International Patent Application No. PCT/AU2017/051129 dated Nov. 23, 2017.
Amiri et al., "Modelling of Opposed Lateral and Longitudinal Tilting Dual-Fan Unmanned Aerial Vehicle", IFAC Proceedings, Elsevier, 2011, vol. 44, pp. 2054-2059.
Ryll, et al., "A Novel Overactuated Quadrotor UAV: Modeling, Control and Experimental Validation", IEEE Transactions on Control Systems Technology, Mar. 2015, vol. 23, No. 2, pp. 540-556.
Jayakody et al., "Robust Control of Vectored Thrust Aerial Vehicles via Variable Structure Control Methods", PhD thesis, School of Mechanical and Manufacturing Engineering University of New South Wales, Aug. 17, 2016, 240 pages.

* cited by examiner

THRUST VECTORED MULTICOPTERS

This application is a national stage application claiming priority to and the benefit of International Application No. PCT/AU2017/051129, filed on Oct. 18, 2017, which claims priority to and the benefit of Australian Patent Application No. 2016904231, filed Oct. 18, 2016.

FIELD

The present invention relates to aircraft having multiple thrust vectoring or tilting thrusters, and computer-implemented control systems for controlling such aircraft.

BACKGROUND

Unmanned aerial vehicles (UAVs) or aerial drones are increasingly being used for a wide variety of important commercial applications, such as aerial surveying or inspection of utility or infrastructure assets. Conventional UAVs with fixed propulsion systems are flown by tilting along the desired direction of motion, in order to generate the necessary acceleration towards that direction. However, tilting the entire UAV disadvantageously tilts any cameras, sensors and other equipment mounted on the fuselage of the UAV, which affects the quality, stability and accuracy of the data obtained from these sensors.

Aircraft having thrust vectoring or tilting propulsion units have been designed to address this issue. Thrust vectoring UAVs that are capable of vertical take-off and landing (VTOL) exhibit the advantages of both fixed-wing and rotary-wing aircraft. This is particularly useful for unmanned aerial vehicles (UAV) used in surveillance or reconnaissance, as this improves manoeuvrability during take-off and landing within constricted spaces, while still allowing for superior speed and altitude in flight compared to helicopters, for example. Secondly, providing thrusters or propulsion units which are controllable and movable independently from the fuselage improves the positional stability of the fuselage, and therefore the quality of images, videos or data captured by equipment mounted on the fuselage. Further, independently thrust vectored propulsion improves the overall stability of the aircraft in response to environmental factors such as wind gusts.

However, existing approaches to UAV with thrust vectored propulsion have various disadvantages. Existing tiltable rotors are generally either directly servo-mounted, or connected via a single or biaxial mount and actuated via pull-pull cables and extended servo arms to rotary motors. Other prior art vectored thrusters involve manipulating control surfaces at the airflow exit of the rotor's ducted fans, eg via movable flaps, rotating vanes, rotating nozzles, etc. Such existing approaches have limited degrees of motion and therefore cannot control the aircraft in angles beyond the designed limits. Additionally, movement of prior art tilting rotors is directly linked to the thrust and rotational moments of the motors, which limits the size of the motor that can be used.

Additionally, the existing approaches to modelling and control of thrust vectored UAV motion have various disadvantages. The equations of motion describing a thrust vectored UAV are non-linear and highly coupled due to the additional degrees of freedom, which significantly increases the complexity of the control system. Prior art linear control systems, such as proportional-integral-derivative (PID) controllers, that may be sufficient for controlling UAVs with fixed thrusters, are generally inadequate for thrust vectored UAVs.

In this context, there is a need for improved thrust vectored UAVs and associated modelling techniques and control algorithms.

SUMMARY

According to the present invention, there is provided a method of operating a multicopter comprising a body and n thrusters, each thruster independently actuated to vector thrust angularly relative to the body about at least a first axis, the method comprising:

modelling dynamics of the multicoptor with a mathematical model comprising coupled, non-linear combinations of thruster variables;

decoupling the mathematical model into linear combinations of thruster control variables;

sensing at least one characteristic of multicopter dynamics;

comparing the sensed data with corresponding target characteristic(s);

computing adjustments in thruster control variables for reducing the difference between the sensed data and the target characteristic(s) according to a control algorithm; and actuating each thruster according to the computed thruster control variables to converge the multicopter towards the target characteristic(s), wherein the control algorithm is based on the decoupled mathematical model such that each thruster control variable can be adjusted independently.

The thruster control variables may be independently adjustable to control thrust amplitude and orientation of each thruster about the first axis.

Each thruster may be further independently operable to vector thrust angularly relative to the body about a second axis orthogonal to the first axis, and wherein the thruster control variables are further independently adjustable to control orientation of each thruster about the second axis.

The model may be decoupled by differentiating with respect to time, such that the thruster control variables comprise first derivatives of a) angular velocity of each thruster, b) orientation of each thruster about its first axis and c) orientation of each thruster about its second axis, and the method may further comprises a step of integrating the new thruster control variables with respect to time to obtain values of thrust amplitude and orientation for actuating each thruster.

Each thruster may be pivotably mounted to the body via two concentrically and orthogonally arranged gimbals configured to rotate the thruster about the first axis and second axis respectively, each gimbal being independently rotatable relative to the body via a worm gear, and wherein the method comprises actuating each worm gear according to the computed thruster control variables.

The control algorithm may be a robust control algorithm configured to account for system uncertainties and/or environmental disturbances.

The robust control algorithm may comprise multiple-surface sliding control.

According to another aspect of the present invention, there is provided an unmanned aerial vehicle system comprising:

a multicopter having n thrusters mounted to a body, each thruster independently actuable to vector thrust angularly relative to the body about at least a first axis;

at least one sensor on the multicopter for sensing at least one characteristic of multicopter dynamics;

a control unit configured to receive the sensed data and compare the sensed data with corresponding target characteristic(s);

wherein the control unit is programmed to compute change(s) in thruster control variables required for reducing the difference between the sensed data and the target characteristic(s) according to a control algorithm;

wherein the control algorithm is based on a decoupled mathematical model of multicopter dynamics, the decoupled model comprising linear combinations of thruster control variables; and wherein the control unit is configured to output the computed change(s) as control signals to independently actuate each thruster.

Each thruster may be further independently operable to vector thrust angularly relative to the body about a second axis orthogonal to the first axis.

The decoupled mathematical model may be obtained by differentiating with respect to time an initial model of multicoptor dynamics comprising coupled, non-linear combinations of thruster variables, such that the decomposed model comprises linear combinations of first derivatives of a) angular velocity of each thruster, b) orientation of each thruster about its first axis and c) orientation of each thruster about its second axis.

Each thruster may be pivotably mounted to the body via two concentrically and orthogonally arranged gimbals configured to rotate the thruster about the first axis and second axis respectively.

Each gimbal may be independently rotatable relative to the body via a worm gear.

Each worm gear may be actuated by a servomotor.

The multicopter may be a quadcopter.

The control algorithm may be a robust control algorithm configured to account for system uncertainties and/or environmental disturbances.

The robust control algorithm may comprise multiple-surface sliding control.

According to another aspect of the present invention, there is provided a computer program product stored on a non-transitory tangible computer readable medium and comprising instructions that, when executed, cause the computer system to:

model dynamics of a multicoptor having n thrusters mounted to a body and independently actuable to vector thrust angularly relative to the body about at least a first axis using a mathematical model comprising coupled, non-linear combinations of thruster variables;

decouple the mathematical model into linear combinations of thruster control variables;

receive at least one characteristic of multicopter dynamics from at least one sensor mounted on the multicopter;

compare the sensed data with corresponding target characteristic(s);

compute adjustments in thruster control variables for reducing the difference between the sensed data and the target characteristic(s) according to a control algorithm; and output control signals to actuate each thruster according to the computed thruster control variables to converge the multicopter towards the target characteristic(s), wherein the control algorithm is based on the decoupled mathematical model such that each thruster control variable can be adjusted independently.

BRIEF DESCRIPTION OF DRAWINGS

Embodiments of the invention will now be described by way of example only with reference to the accompanying drawings, in which.

DETAILED DESCRIPTION

Figure 1:
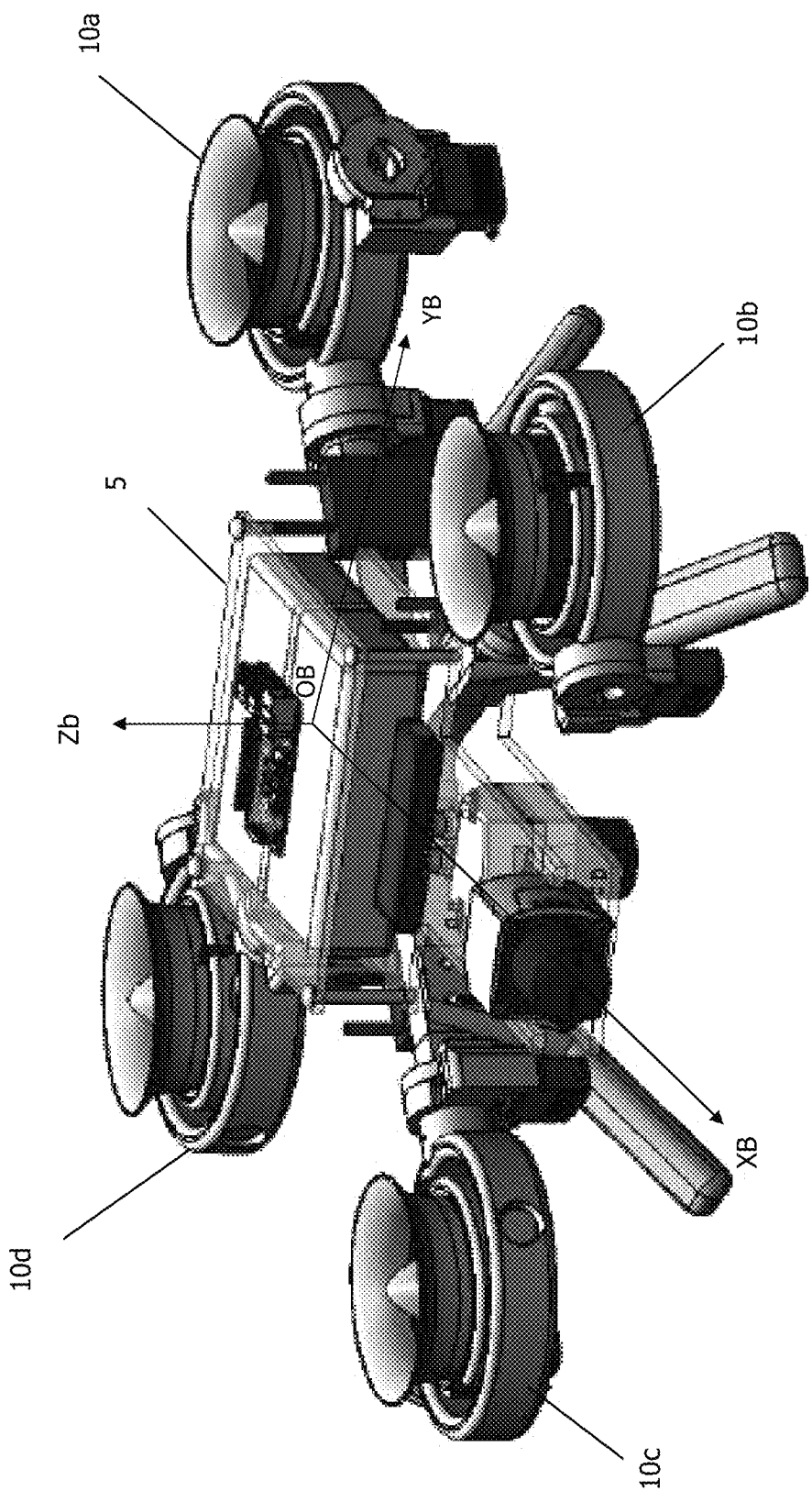
FIG. 1 is a perspective view of a multicopter according to an embodiment of the invention.

FIG. 1 shows a schematic view of an unmanned aerial vehicle (UAV) 1 according to one embodiment of the invention. The UAV 1 is a quadcopter comprising a body 5 and four thrusters 10a, 10b, 10c, 10d mounted to the body. The thrusters 10 may comprise rotors, propellers, ducted fans, or any other suitable propulsion means. Each thruster 10 is independently operable to vector thrust angularly relative to the body 5 about two axes 15, 20. As shown more clearly in FIG. 2, the thruster 10 is rotatable relative to the body about a first axis 15 which is parallel to the longitudinal axis of arm 30 connecting thruster 10 to body 5. Thruster 10 is also rotatable relative to the body about a second axis 20 perpendicular to first axis 15. Axis 25 denotes the thruster's thrust force axis.

Preferably, thrusters 10a, 10b, 10c, 10d are located at approximately the same distance from the centre of gravity of the UAV 1, and are arranged in approximate rotational symmetry about the centre of gravity. However, the mathematical model and control algorithm of the present invention are designed to handle asymmetries of the UAV via the inertial term, described in more detail below.

In some embodiments, each thruster 10 may be vectored relative to the body 5 about only a single axis. Accordingly, for each thruster 10, at least two variables are controlled independently of the other thrusters, ie the thrust amplitude and the angle of rotation of the thruster 10 relative to the body 5 about one axis. In preferred embodiments, as shown in FIG. 1, each thruster 10 may also be vectored about a second axis, introducing a third control variable that is the angle of rotation of each thruster relative to the body 5 of the UAV about the second axis. In other embodiments, the individual thrusters 10 may be grouped together and visualised as a single thruster that has orthogonally arranged gimbals configured as described in this paragraph and hereafter.

Figure 3:
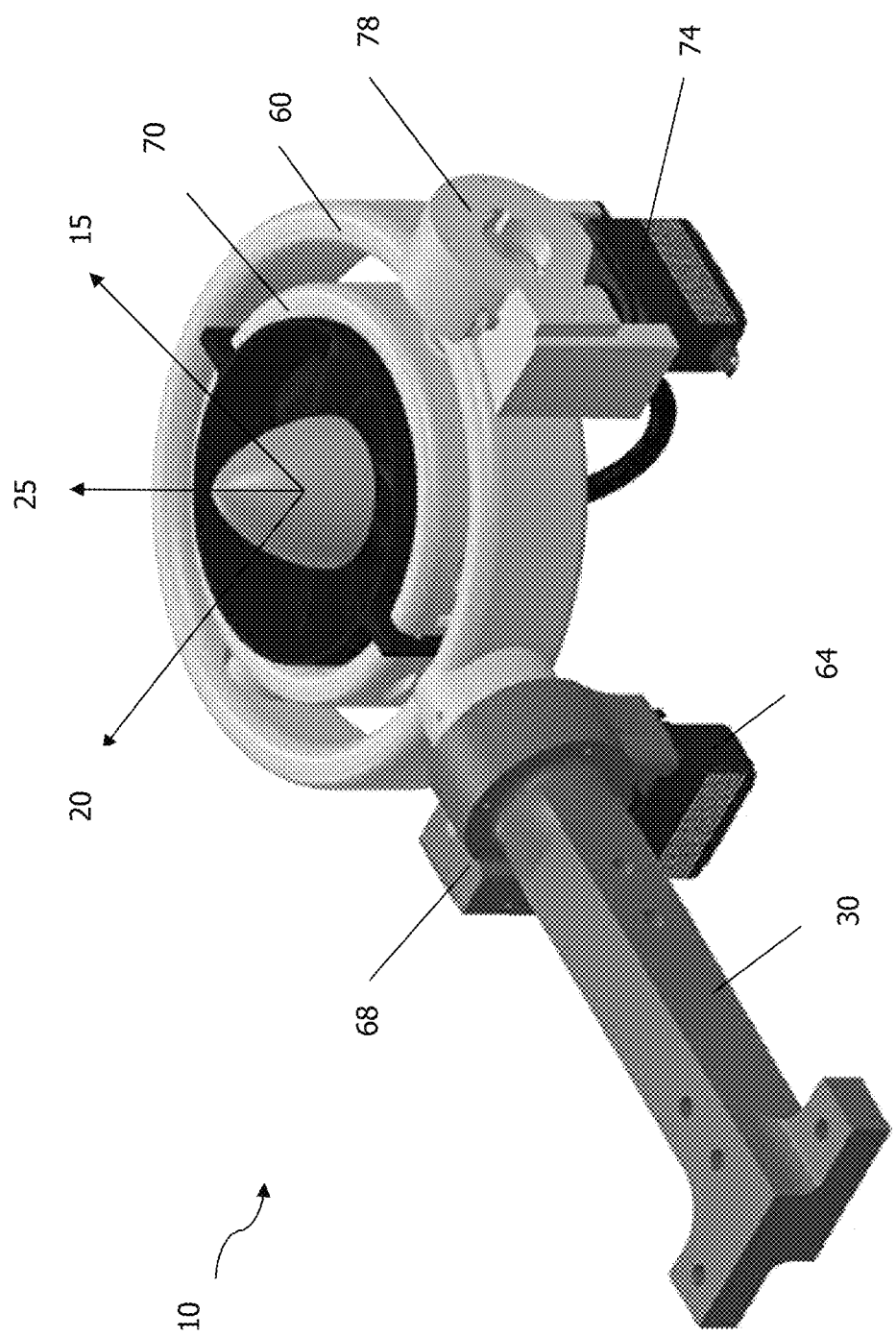
FIG. 3 is a perspective view of a thruster according to an embodiment of the invention.
Figure 4:
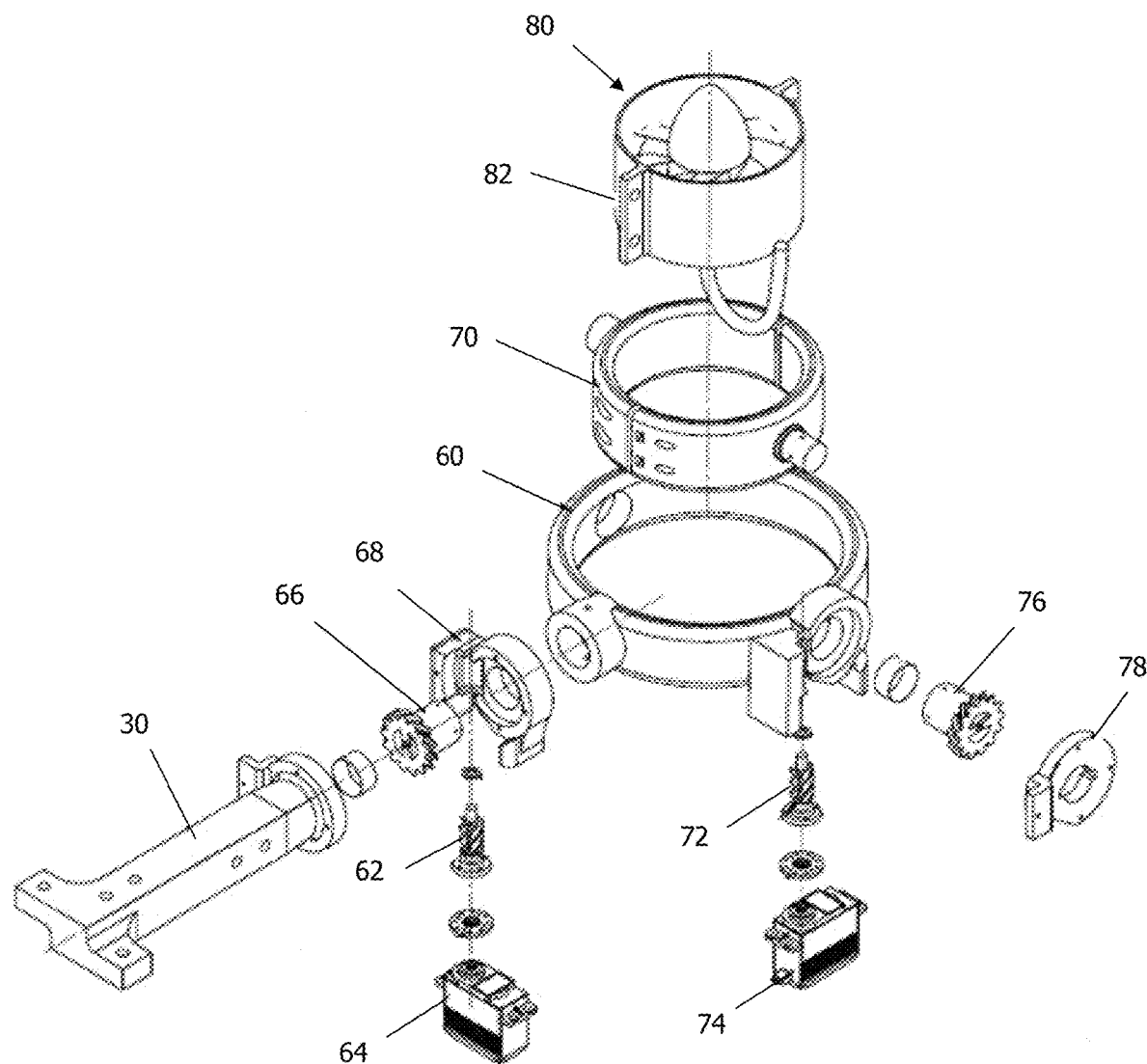
FIG. 4 is an exploded view of the thruster of FIG. 3.

As shown in FIGS. 3 and 4, the thruster 10 according to one embodiment comprises a ducted fan 80 pivotably mounted to arm 30 via two concentric, orthogonally arranged gimbal rings 60, 70. In this example, the outer gimbal 60 is configured to rotate the ducted fan 80 about first axis 15 and the inner gimbal 70 is configured to rotate the ducted fan 80 about the second axis 20.

Each gimbal 60, 70 may be independently rotatable relative to the body 5 via a worm gear arrangement. That is, the outer gimbal 60 may be rotatable via worm 62 and worm gear 66, and the inner gimbal 70 may be rotatable via worm 72 and worm gear 76. The worm gear arrangement allows the ducted fan 80 to be rotated with precision to any desired angle, so that the thruster 10 is capable of handling high thrust whilst accurately maintaining the desired orientation.

The worm gear arrangements may each be actuated by servomotors 64, 74, or any other suitable actuators. As shown in FIG. 4, the worm gear arrangements on the outer and inner gimbals may be mounted and protected within gear housing 68, 78 respectively.

The worm gear design advantageously provides for full directional control of the thruster about the entire range of gimbal motion while maintaining high accuracy and high torque. Further, the worm gear arrangement allows for self-locking, such that the position of the ducted fan 80 may be maintained without requiring additional power, thus improving efficiency while reducing the size of the motor required.

Figure 2:
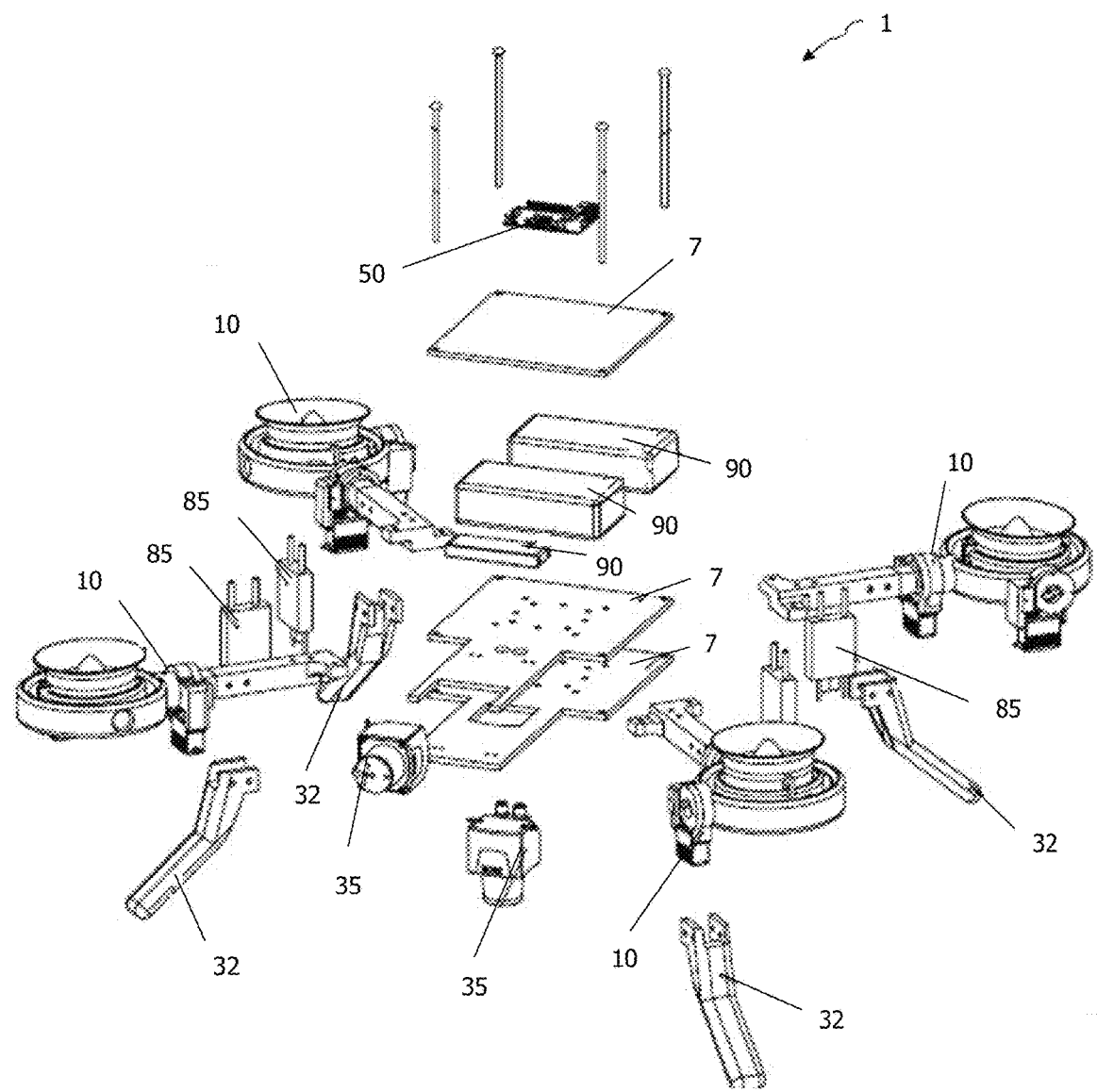
FIG. 2 is an exploded view of the multicopter of FIG. 1.

Referring to FIG. 2, flight control unit 50 is programmed to receive and compare target flight performance (eg via user input) with data from sensors 35 positioned on the UAV. The flight control unit 50 then outputs control signals to the thruster actuators 55 (which may comprise thruster motors 85 and gimbal motors 64, 74) that control the thrust force and/or thrust vector of each thruster 10, in order to minimise the difference or error between the target values and the measured data according to the control algorithm.

Target flight performance input into control unit 50 may be high level targets such as target position, orientation, velocity, acceleration, etc of the UAV. This may be input by a user to the control unit 50, eg in real time, wirelessly, etc. The target flight performance criteria may additionally or alternatively be pre-set, eg to follow a predetermined route.

Sensors 35 capture data relevant to the flight performance of the UAV, for example position, orientation, pitch, roll, velocity, angular velocity, etc. The sensors 35 may comprise altimeters, gyroscopes, magnetometers, cameras, accelerometers, Global Positioning System (GPS) receivers, proximity sensors, inertial measurement units (IMU) or combinations thereof. The sensors 35 may be located on the body 5 of the UAV and/or on the thrusters 10. Sensors on the thrusters may additionally or alternatively capture data relating to operation of each thruster, for example, position or angle of the thruster 10 relative to the body 5 of the UAV, angular velocity of associated fans, propellers or rotors, voltage, current, power, motor torque, or combinations thereof. Data from the sensors 35 is transmitted to control unit 50. Data from the sensors 35 may additionally be transmitted, eg via the control unit 50, to the user or pilot of the UAV.

Control unit 50 may be mounted on a support frame 8 of the body 5 of the UAV. Power source 90 for supplying power to the thruster motors 85, gimbal motors 64, 74, sensors 35, control unit 50, etc, may also be mounted on the support frame 8. In one embodiment, the UAV may have legs 32 configured to elevate the body 5 and thrusters 10 above the ground.

Figure 5:
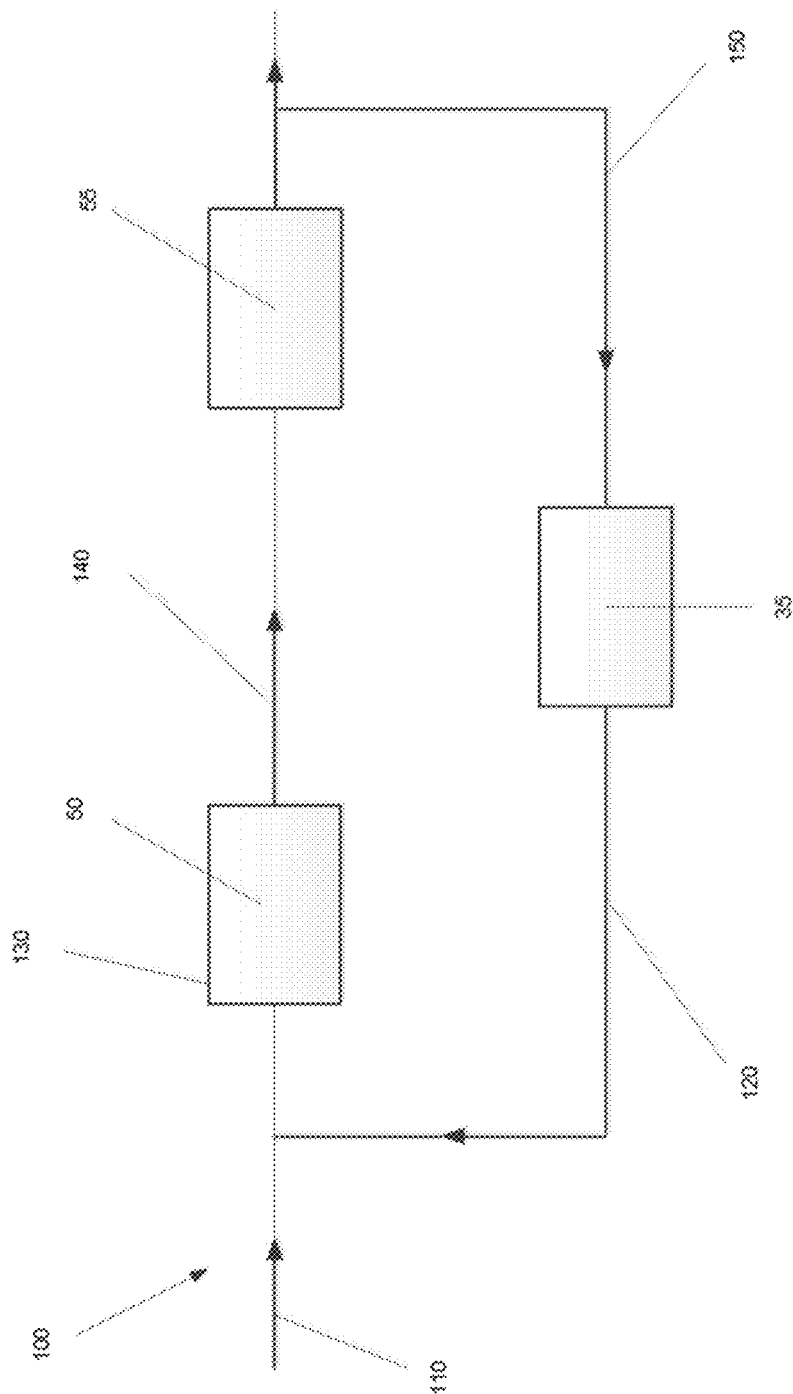
FIG. 5 is a flowchart illustrating a method for operating a thrust vectored multicopter according to an embodiment of the invention.

FIG. 5 is a flowchart of a method 100 for controlling a multicopter 1 according to an embodiment of the invention. The method 100 starts at operation 110 by receiving target input values from the UAV pilot, eg via command signals transmitted wirelessly in real time. At operation 120, sensed data is received from sensors 35. At operation 130, the target values are compared with sensed data to determine the error. The control unit 50 computes, according to the control algorithm based on a decoupled UAV dynamics model, the thruster control variables required for minimising the error. At operation 140, the computed control variables are input to the thruster actuators (eg thruster motors 85 and gimbal motors 64, 74). At operation 150, the flight characteristics are sensed by sensors 35, to be fed back to the control unit 50 at operation 120.

In comparison with conventional fixed rotor UAV systems, in which only the thrust amplitude of the rotors is controllable, embodiments of the present invention comprise overactuated systems. For example, where each thruster 10 is independently vectored or tilted along two axes, eight additional control inputs are included in the system (in addition to the four conventional thrust amplitude variables), to control the UAV which has six degrees of freedom (DoF), le translation and rotation in three spatial dimensions. This results in a non-linear, highly coupled dynamics model of the overactuated UAV system, in which the thruster control variables are coupled such that no unique solution can be directly obtained. Accordingly, prior art systems utilising linear control algorithms, eg using PIDs, cannot provide optimal stability control of thrust vectored UAVs, even with careful tuning.

The control algorithm of the present invention utilises a technique for modelling the dynamics of overactuated, thrust vectored UAV systems, which allows for each thruster variable to be independently controlled. The UAV 1 may have any number of thrusters 10. As described in more detail below, the mathematical model and control algorithm of the present invention are readily extendable to handle any number of thrusters.

The UAV 1 is modelled with the body 5 and each thruster 10 treated as rigid bodies immersed in a fluid. G is the robot's center of mass, m its mass, and J its inertia matrix.

Referring to FIG. 1, the world inertial reference frame is denoted $W=\{O_W; X_W; Y_W; Z_W\}$. $B=(O_B; X_B; Y_B; Z_B)$ refers to the reference frame attached to the body 5 of the UAV and $P_i=\{O_{Pi}; X_{Pi}; Y_{Pi}; Z_{Pi}\}$ refers to the reference frame associated with the $i^{th}$ thruster, where i=1, 2, ..., n refers to the number of thrusters on the multicopter. As discussed above, in this embodiment of the invention, the first axis of rotation 15 of the thruster refers to $X_{Pi}$, the second axis of rotation 20 refers to $Y_{Pi}$ and the thruster thrust force axis 25 refers to $Z_{Pi}$. $\alpha_i$ and $\beta_i$ represent each thruster's orientation or tilting angle with respect to axes 15 ($X_{Pi}$) and 20 ($Y_{Pi}$) respectively. $\omega_B \in R^3$ is the angular velocity of the UAV body 5, expressed in the body reference frame, B. Similarly, $\omega_{pi} \in R^3$ is the angular velocity of the $i^{th}$ thruster expressed in the propeller reference frame $P_i$.

$R_2^1$ Is the notation used for the rotation matrix representing the orientation of frame 2 with respect to frame 1. Using appropriate rotational matrices, the relative motion of each thruster 10 may be linked to the body reference frame.

$$R_X(\theta) := \begin{bmatrix} 1 & 0 & 0 \\ 0 & \cos(\theta) & -\sin(\theta) \\ 0 & \sin(\theta) & \cos(\theta) \end{bmatrix},$$

$$R_Y(\theta) := \begin{bmatrix} \cos(\theta) & 0 & \sin(\theta) \\ 0 & 1 & 0 \\ -\sin(\theta) & 0 & \cos(\theta) \end{bmatrix},$$

and $$R_Z(\theta) := \begin{bmatrix} \cos(\theta) & -\sin(\theta) & 0 \\ \sin(\theta) & \cos(\theta) & 0 \\ 0 & 0 & 1 \end{bmatrix}$$

represent the standard rotational matrix with respect to roll, pitch, and yaw of the frame respectively.

It follows from FIGS. 1 and 2, that:

$$R^B_{P_i} = R_Z\left(\frac{(2i-3)}{n}\pi\right)R_X(\alpha_i)R_Y(\beta_i), \quad (1)$$

$$O^B_{P_i} = R_Z\left(\frac{(2i-3)}{n}\pi\right)\begin{bmatrix}L\\0\\0\end{bmatrix}, \quad (2)$$

where i=1, 2, . . . , 4 in this quadcopter example, and L is the length of the arm 30 between $O_{PI}$ and $O_B$. Using Euler's theorem of angular momentum, the applied torque acting on the $i^{th}$ propeller, $\tau_{P_i}$, is defined as $$\tau_{P_i} = I_{P_i}\dot\omega + \omega_{P_i}\times I_{P_i}\omega_{P_i} + [0\ \ 0\ \ k_c\omega_{P_{iZ}}|\omega_{P_{iZ}}|]^T, \quad (3)$$

where $I_{P_i}$ is the inertia matrix of the $i^{th}$ propeller, $\vec\omega_{P_{iz}}$ is the third component of vector $\omega_{P_i}$, $k_c{>}0$ is the coefficient of proportionality between $\omega_{P_{iz}}$ and the counter-rotating torque about the $Z_{PI}$ axis due to air drag, $$\omega_{P_i} = R^{B^{-1}}_{P_i}\omega_B + \begin{bmatrix}\dot\alpha_i\\\dot\beta_i\\\dot\omega_i\end{bmatrix} \quad (4)$$

and $\hat w_i$ is the angular velocity of the $i^{th}$ propeller. Defining $T_{P_i}$ as the thrust generated by the $i^{th}$ propeller, it follows that $$T_{P_i}=[0\ \ 0\ \ k_f\hat\omega_i|\hat\omega_i|]^T \quad (5)$$

where $k_f{>}0$ is a fixed proportionality constant.

Using Euler's equations for angular momentum again in the body coordinate frame, B, subsystems $S_1$ and $S_2$, describing the angular acceleration and position of the multicopter respectively, are derived as:

$$S_1: I_B\dot\omega_B = \sum_{i=1}^{n}(O^B_{P_i}\times R^B_{P_i}T_{P_i} - R^B_{P_i}\tau_{P_i}) - \omega_B\times I_B\omega_B \quad (6)$$

$$S_2: m\begin{bmatrix}\ddot X_B\\\ddot Y_B\\\ddot Z_B\end{bmatrix} = R^B_W\begin{bmatrix}0\\0\\-mg\end{bmatrix} + \sum_{i=1}^{n}R^B_{P_i}T_{P_i} + F_D$$

where $I_B$ is the inertial matrix of the body 5 of the UAV and $F_D$ is the drag force on the UAV.

The inertial matrix $I_B$ may be used to account for asymmetries in the UAV, so that the subsystems $S_1$ and $S_2$ may be extended to describe the dynamics of asymmetrical or unbalanced UAVs.

In embodiments where the multicopter has fewer or more than four thrusters, the subsystems may be generalised by allowing i=1, 2, . . . , n, and using equations (1) to (5), to obtain subsystems $S_3$ and $S_4$ describing the angular acceleration and position of the multicopter respectively:

$$S_3: I_B\dot\omega_B = \sum_{i=1}^{n}(O^B_{P_i}\times R^B_{P_i}T_{P_i} - R^B_{P_i}\tau_{P_i}) - \omega_B\times I_B\omega_B \quad (7)$$

$$S_4: m\begin{bmatrix}\ddot X_B\\\ddot Y_B\\\ddot Z_B\end{bmatrix} = R^B_W\begin{bmatrix}0\\0\\-mg\end{bmatrix} + \sum_{i=1}^{n}R^B_{P_i}T_{P_i} + F_D$$

In applications where the sensor 35 for capturing position of the UAV is a GPS sensor which references the world inertial reference frame W, a body to world rotation matrix $R_B^W$ may be applied to subsystem $S_4$:

$$S_4: m\ddot x = \begin{bmatrix}0\\0\\-mg\end{bmatrix} + R^W_B\sum_{i=1}^{n}R^B_{P_i}T_{P_i}$$

where vector $\ddot x$ is the UAV's position in frame W. Similarly, using azimuth, roll and pitch angles, subsystem $S_4$ can be described in North east down (NED) coordinates.

It will be appreciated that in the case $\alpha_i=\beta_i=\dot\alpha_i=\dot\beta_i=0$, subsystems $S_3$ and simply model the dynamics of conventional UAV with fixed thrusters.

However, where the thrusters are rotatable by $\alpha_i$ and/or $\beta_i$ about axes 15 and/or 20 respectively, due to the term $R_{P_i}^B$ subsystems $S_1$, $S_2$, $S_3$, and $S_4$ are defined in terms of highly coupled, non-linear combinations of thruster control variables $\alpha_i$, $\beta_i$ and $\omega_{P_i}$. That is, the equations describing the dynamics of the multicopter, when arranged in terms of $\omega_{P_i}$, include sines and cosines of $\alpha_i$ and $\beta_i$ embedded in non-linear functions such that no unique solution for $\alpha_i$ or $\beta_i$ can be directly computed for a given position or angular velocity of the multicopter.

According to one embodiment of the present invention, the model may be decoupled by differentiating with respect to time. This results in a model comprising linear combinations of new thruster control variables $\ddot\alpha_i$, $\ddot\beta_i$ and $\dot\omega_{P_i}$. That is, the model in equation (7) can be decomposed as:

$$\dddot x_B = \dot R^B_W\begin{bmatrix}0\\0\\-g\end{bmatrix} + \frac{1}{m}\sum_{i=1}^{n}\left(\frac{\partial R^B_{P_i}}{\partial\alpha_i}T_{P_i}\dot\alpha_i + \frac{\partial R^B_{P_i}}{\partial\beta_i}T_{P_i}\dot\beta_i + R^B_{P_i}\frac{\partial T_{P_i}}{\partial\hat\omega_i}\dot{\hat\omega}_i\right) + \quad (18)$$

$$\dot D_{x_B} = \dot R^B_W\begin{bmatrix}0\\0\\-g\end{bmatrix} + F_{x\alpha}(\alpha,\beta,\hat\omega)\dot\alpha +$$

$$F_{x\beta}(\alpha,\beta,\hat\omega)\dot\beta + F_{x\hat\omega}(\alpha,\beta,\hat\omega)\dot{\hat\omega} + \dot D_{x_B}$$

$$\dot\omega_B = I_B^{-1}\left[\sum_{i=1}^{n}\left(O^B_{P_i}\times\left(\frac{\partial R^B_{P_i}}{\partial\alpha_i}T_{P_i}\dot\alpha_i + \frac{\partial R^B_{P_i}}{\partial\beta_i}T_{P_i}\dot\beta_i + R^B_{P_i}\frac{\partial T_{P_i}}{\partial\hat\omega_i}\dot{\hat\omega}_i\right)-\right.\right.$$

$$\left.\left.\frac{k_c}{k_f}\left(\frac{\partial R^B_{P_i}}{\partial\alpha_i}T_{P_i}\dot\alpha_i + \frac{\partial R^B_{P_i}}{\partial\beta_i}T_{P_i}\dot\beta_i + R^B_{P_i}\frac{\partial T_{P_i}}{\partial\hat\omega_i}\dot{\hat\omega}_i\right)\right)\right] + \dot D_\omega =$$

$$F_{\omega\alpha}(\alpha,\beta,\hat\omega)\dot\alpha + F_{\omega\beta}(\alpha,\beta,\hat\omega)\dot\beta + F_{\omega\hat\omega}(\alpha,\beta,\hat\omega)\dot{\hat\omega} + \dot D_\omega$$

where
$$\alpha = [\alpha_1,\alpha_2,\ldots,\alpha_n]^T, \quad \dot\alpha = [\dot\alpha_1,\dot\alpha_2,\ldots,\dot\alpha_n]^T,$$
$$\beta = [\beta_1,\beta_2,\ldots,\beta_n]^T, \quad \dot\beta = [\dot\beta_1,\dot\beta_2,\ldots,\dot\beta_n]^T,$$
$$\hat\omega = [\hat\omega_1,\hat\omega_2,\ldots,\hat\omega_n]^T, \quad \dot{\hat\omega} = [\dot{\hat\omega}_1,\dot{\hat\omega}_2,\ldots,\dot{\hat\omega}_n]^T$$

This means that the model is now in a compact form, with the new control variables, $\dot\alpha_i$, $\dot\beta_i$, and $\dot\omega_{P_i}$ decoupled from each other:

$$\ddot{x}_B = \quad (19)$$

$$\dot{R}_W^B \begin{bmatrix} 0 \\ 0 \\ -g \end{bmatrix} + F_{x\dot{\alpha}}(\alpha, \beta, \hat{\omega})\dot{\alpha} + F_{x\dot{\beta}}(\alpha, \beta, \hat{\omega})\dot{\beta} + F_{x\dot{\omega}}(\alpha, \beta, \hat{\omega}) + \dot{D}_{x_B},$$

$$\dot{\omega}_B = F_{x\dot{\alpha}}(\alpha, \beta, \hat{\omega})\dot{\alpha} + F_{x\dot{\beta}}(\alpha, \beta, \hat{\omega})\dot{\beta} + F_{\omega\dot{\omega}}(\alpha, \beta, \hat{\omega})\dot{\omega} + \dot{D}_\omega$$

The control variables may accordingly be individually adjusted in accordance with any arbitrary control algorithm selected for the system. For example, sensed position and velocity of the multicopter may be input into the control system together with target position and velocity values. The control algorithm then outputs the required individual adjustments to the new thruster control variables, optionally integrating with respect to time to obtain real world values of $\alpha_i$, $\beta_i$, and $\omega_{P_i}$, in order to converge the position and velocity of the multicopter to the target values. In other embodiments, the model may be decoupled via alternative techniques, eg by applying inequalities.

As discussed, while the UAV could feasibly be controlled via a linear control system utilising the coupled, non-linear model of flight dynamics, decoupling the model according to the present invention allows for optimal stability control, since the system is then characterised by the thruster variables individually and independently of each other. Further, according to an embodiment, the decoupled model may be used to design a robust control algorithm that takes into account system uncertainties such as noise, mismatched uncertainties, environmental and aerodynamic disturbances, etc.

In one embodiment, a multiple-surface sliding control algorithm may be applied, for example according to the formulation discussed in Khoo, S., Man, Z. and Zhao, S. (2008) *Automatica*, 44(11), pp. 2995-2998. Specifically, defining $x_B = [X_B \ Y_B \ Z_B]^T$ and $T_{P_z}^i = [0 \ 0 \ k_c \omega_{P_{iz}} | \omega_{P_{iz}} |]^T$, and rearranging subsystems $S_3$ and $S_4$, yields:

$$\dot{\omega}_B = I_B^{-1} \left[ \sum_{i=1}^n (O_{P_i}^B \times R_{P_i}^B T_{P_i} - R_{P_i}^B T_{P_z i}) \right] + D_\omega \quad (10)$$

$$\ddot{x}_B = R_W^B \begin{bmatrix} 0 \\ 0 \\ -g \end{bmatrix} + \frac{1}{m} \sum_{i=1}^n R_{P_i}^B T_{P_i} + D_{x_B}$$

where:

$$D_\omega = -I_B^{-1} \left[ \sum_{i=1}^n R_{P_i}^B (I_{P_i} \dot{\omega}_{P_i} + \omega_{P_i} \times I_{P_i} \omega_{P_i}) + \omega_B \times I_B \omega_B \right] + \Delta_\omega \quad (11)$$

$$D_{x_B} = \frac{1}{m} F_D + \Delta_{x_B} \quad (12)$$

with $\Delta \omega$ and $\Delta x_B$ representing the external disturbances that affect the rate of change of the angular momentum and linear momentum of the UAV respectively. Defining:

$$x_1 = x_B, x_2 = \dot{x}_B, X_3 = \ddot{x}_B, x_4 = \int \omega_B dt, x_5 = \omega_B, x_6 = \dot{\omega}_B,$$

the system (19) can be rewritten in a cascaded form as follows:

$$\dot{x}_1 = x_2$$

$$\dot{x}_2 = x_3$$

$$\dot{x}_3 = \dot{R}_W^B \begin{bmatrix} 0 \\ 0 \\ -g \end{bmatrix} + B_1 U + \dot{D}_{x_B}$$

$$\dot{x}_4 = x_5$$

$$\dot{x}_5 = x_6$$

$$\dot{x}_6 = B_2 U + \dot{D}_\omega$$

The multiple-surface sliding control algorithm is effective in controlling the cascade system above to ensure system stability and good tracking performance even with the existence of external disturbances and system non-linearity.

Alternative control algorithms may be used, for example backstepping, Lyapunov, H-infinity control, sliding mode control, etc., optionally together with adaptive and/or intelligent control components such as adaptive control, fuzzy logic, neural networks, etc.

Embodiments of the invention provide aircraft, in particular UAV, having multiple thrusters that are each able to be independently and precisely vectored relative to the body or fuselage of the aircraft. This may improve manoeuvrability of the UAV, while maintaining the orientation and stability of the body 5, to thereby improve the performance of the UAV in various applications such as photography, tracking, surveillance, carrying of cargo, etc.

Embodiments of the invention additionally or alternatively provide methods for controlling thrust vectoring aircraft based on models of flight dynamics that are specifically modified to handle overactuation of the system resulting from the additional control variables associated with each thruster. The decoupled models allow for independent control of each thruster variable, and may thus enable control algorithms to be designed for optimal stability control and/or robustness.

The above embodiments have been described by way of example only and modifications are possible within the scope of the claims that follow.

The invention claimed is:

1. A method of operating a multicopter comprising a body and n>2 thrusters, each thruster independently actuated to vector thrust angularly relative to the body about first and second axes, the method comprising:
   modelling dynamics of the multicopter with a mathematical model comprising coupled, non-linear combinations of thruster variables;
   decoupling the mathematical model into linear combinations of thruster control variables,
   sensing at least one characteristic of multicopter dynamics;
   comparing the sensed data with corresponding target characteristic(s);
   computing adjustments in thruster control variables for reducing the difference between the sensed data and the target characteristic(s) according to a control algorithm; and
   actuating each thruster according to the computed thruster control variables to converge the multicopter towards the target characteristic, wherein the control algorithm is based on the decoupled mathematical model such that each thruster control variable can be adjusted independently, wherein the thruster control variables are independently adjustable to control thrust amplitude and orientation of each thruster about the first axis, wherein each thruster is further independently operable to vector thrust angularly relative to the body about a second axis orthogonal to the first axis, wherein the thruster control variables are further independently adjustable to control orientation of each thruster about the second axis, wherein the model is decoupled by differentiating with respect to time, such that the thruster control variables comprise first derivatives of a) angular velocity of each thruster, b) orientation of each thruster about its first axis and c) orientation of each thruster about its second axis, wherein the method further comprises a step of integrating the computed thruster control variables with respect to time to obtain values of thrust amplitude and orientation for actuating each thruster, wherein each thruster is pivotably mounted to the body via two concentrically and orthogonally arranged gimbals configured to rotate the thruster about the first axis and second axis respectively, each gimbal being independently rotatable relative to the body via a worm gear, and wherein each worm gear is actuated according to the computed thruster control variables.

2. The method of claim 1, wherein the control algorithm is a robust control algorithm configured to account for system uncertainties and/or environmental disturbances.

3. The method of claim 2, wherein the robust control algorithm comprises multiple-surface sliding control.

4. An unmanned aerial vehicle system comprising:
a multicopter having n>2 thrusters mounted to a body, each thruster independently actuable to vector thrust angularly relative to the body about at least a first axis,
at least one sensor on the multicopter for sensing at least one characteristic of multicopter dynamics; and
a control unit configured to receive the sensed data and compare the sensed data with corresponding target characteristic(s),
wherein the control unit is programmed to compute change(s) in thruster control variables required for reducing the difference between the sensed data and the target characteristic(s) according to a control algorithm, wherein the control algorithm is based on a decoupled mathematical model of multicopter dynamics, the decoupled model comprising linear combinations of thruster control variables, wherein the control unit is configured to output the computed change(s) as control signals to independently actuate each thruster, wherein each thruster is further independently operable to vector thrust angularly relative to the body about a second axis orthogonal to the first axis, wherein the decoupled mathematical model is obtained by differentiating with respect to time an initial model of multicopter dynamics comprising coupled, non-linear combinations of thruster variables, such that the decomposed model comprises linear combinations of first derivatives of a) angular velocity of each thruster, b) orientation of each thruster about its first axis and c) orientation of each thruster about its second axis, wherein each thruster is pivotably mounted to the body via two concentrically and orthogonally arranged gimbals configured to rotate the thruster about the first axis and second axis respectively, wherein each gimbal is independently rotatable relative to the body via a worm gear.

5. The unmanned aerial vehicle system of claim 4, wherein each worm gear is actuated by a servomotor.

6. The unmanned aerial vehicle system of claim 5, wherein the multicopter is a quadcopter.

7. The unmanned aerial vehicle system of claim 4, wherein the control algorithm is a robust control algorithm configured to account for system uncertainties and/or environmental disturbances.

8. The unmanned aerial vehicle system of claim 7, wherein the robust control algorithm comprises multiple-surface sliding control.

9. A computer program product stored on a non-transitory tangible computer readable medium and comprising instructions that, when executed, cause the computer system to perform the method of claim 1.

* * * * *